Patented Apr. 27, 1954

2,676,927

UNITED STATES PATENT OFFICE 2,676,927

NONFLAMMABLE CELLULAR RESINOUS BODIES AND METHOD OF MAKING SAME

John L. McCurdy and Leo Kin, Midland, Mich., assignors to The Dow Chemical Company, Midland, Mich., a corporation of Delaware No Drawing. Application September 11, 1950, Serial No. 184,329

5 Claims. (Cl. 260—2.5)

This invention concerns non-flammable solid cellular bodies of certain thermoplastic resin compositions and a method of making the same. It is particularly concerned with solid cellular bodies, composed for the most part of a multiplicity of individually closed cells having thin walls of an alkenyl aromatic resin composition, which cellular bodies are non-flammable, possess excellent heat-insulating properties, and are adapted for use as insulating materials, e. g. in the walls of refrigerators, or buildings, or as coverings over brine lines, etc.

By an "alkenyl aromatic resin" is meant a solid polymer of one or more polymerizable alkenyl aromatic compounds. The polymeric resin comprises in chemically combined form at least 50 per cent by weight of at least one alkenyl aromatic compound having the general formula:—

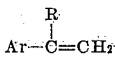

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, alpha-methylstyrene, ortho-methylstyrene, metamethylstyrene, para-methylstyrene, ar-ethylstyrene, ar-vinylxylene, ar-chlorostyrene, or ar-bromostyrene; the solid copolymers of two or more of such alkenyl aromatic compounds with one another; and solid copolymers of one or more of such alkenyl aromatic compounds with minor amounts of other readily polymerizable olefinic compounds such as divinylbenzene, methylmethacrylate, or acrylonitrile, etc.

The expressions "non-flammable" and "flameproof," as employed herein, mean incapable of burning or sustaining a flame for more than 15 seconds after a composition has been fully heated in an open flame and then removed from the flame used to heat the same. In other words, the compositions provided by the invention are self-extinguishing after removal from a flame used to heat the same.

It is known that the halogen content of halogen compounds often has an effect of reducing the flammability both of the compounds containing the halogen and of flammable organic materials intimately admixed therewith. There are numerous instances in which the flammability of organic materials such as wood, paper, and cellulose derivatives, etc., has been reduced by admixing organic halogen-containing compounds therewith. It is also known that bromine-containing compounds possess, in most instances, a greater flame-retarding action than do corresponding chlorine-containing compounds. However, the organic bromine-containing compounds differ widely among themselves as regards the flame-retarding action of the bromine contained therein. Many organic bromides have little, or no, flame-retarding action. Also, many organic bromine-containing compounds are excessively unstable to light or heat, and decompose to evolve hydrogen bromide and lose their fire-retarding action at temperatures lower than the combustion point of compositions comprising the same. Organic bromides are expensive. In many instances, the proportion of such compounds required to render organic materials treated therewith non-flammable is large and adds considerably to the cost of the products.

Accordingly, although it is known that organic bromides often exhibit a fire-retarding action, it remains a difficult problem to discover such compound, or compounds, which may economically and satisfactorily be used to flameproof a given combustible organic material. The alkenyl aromatic resins which are employed in making the cellular bodies of the invention are, of themselves, thermoplastic solids having good strength characteristics and good dimensional stability. The quality, i. e. strength, appearance and usefulness, of the cellular bodies prepared from the resins is dependent upon retention of these properties after formation of the cellular products. Most organic substances, if incorporated in large amount with the resins, e. g. in amount exceeding 10 per cent by weight, impair seriously one or more of the desirable properties of the resins, particularly their tensile strength and their dimensional stability at moderately elevated temperatures, and thus render the resins poorly suited for use in making the cellular bodies. Many organic bromides, in particular, are of low compatibility with such resins, or have little, if any, flame-retarding action and, when added in considerable amount to the resins, lower greatly the heat distortion temperature of the resins and render it difficult or impossible to produce dimensionally stable cellular bodies from the resultant resin compositions. Also, organic bromides, if added in large proportion to polystyrene or other alkenyl aromatic resins, add considerably to the cost of the products.

We have discovered that the alkenyl aromatic resins may be rendered non-flammable by incorporating therewith only a small proportion, e. g. between 1 and 10 per cent by weight, of certain organic bromides and that these particular organic bromides are compatible with the resins in proportions sufficient to render the resins non-flammable. We have further found that the resultant non-flammable resin compositions possess good strength characteristics and good dimensional stability and may be employed to produce, by a known procedure, solid, cellular bodies which are stable, non-flammable, possess good heat-insulating properties and are adapted for use as insulating materials.

The organic bromides with which the invention is concerned are (1) polyhalogenated alkyl aromatic hydrocarbons of the benzene series containing from 8 to 10 carbon atoms in the molecule and having at least two, but not all, of the hydrogen atoms of each alkyl radical replaced by bromine; (2) saturated polybrominated aliphatic hydrocarbons containing from 3 to 5 carbon atoms and from 3 to 5 bromine atoms and having at least one hydrogen atom per atom of bromine in the molecule; (3) polybrominated monohydric alcohols containing from 3 to 5 carbon atoms and from 2 to 5 bromine atoms and having at least one hydrogen atom per atom of bromine in the molecule; and (4) polybrominated diethyl ether containing one or two bromine atoms on each ethyl radical. Examples of the polyhalogenated alkyl aromatic hydrocarbons are alpha,beta - dibromo - ethylbenzene, di - (alpha,-beta-dibromoethyl) benzene, ar-bromo-alpha,-beta-dibromoethylbenzene, ar-chloro-alpha,beta-dibromoethyl-benzene and di-(bromomethyl) benzene, etc. Examples of the saturated polybrominated aliphatic hydrocarbons are 1,2-dibromopropane, 1,2-dibromobutane, 1,2,3-tribromopropane, 1,2,3-tribromobutane and tetrabromopentane, etc. Examples of the saturated polybrominated aliphatic monohydric alcohols are 2,3-dibromopropanol, tribromobutanol, and tetrabromopentanol, etc. Examples of the polybrominated diethyl ethers are di-(beta-bromoethyl) ether, di-(beta-beta-dibromoethyl) ether and di-(alpha,beta-dibromoethyl) ether, etc. Of these several groups of brominated organic compounds, the polybrominated alkyl aromatic compounds, particularly alpha,beta - dibromoethylbenzene, are preferred.

The effectiveness of the above-mentioned organic bromides in reducing the flammability of alkenyl aromatic resins comprising the same is surprisingly great, i. e. it is far greater than would be expected in view of the small proportion of bromine in the resin composition. For instance, an intimate mixture of polystyrene and 10 per cent by weight of hexabromobenzene, which mixture contains 8.7 per cent by weight of bromine, burns and sustains a flame. In contrast, the composition formed by thoroughly admixing 1 per cent by weight of alpha,beta-dibromoethylbenzene with polystyrene contains only about 0.6 per cent of bromine, but is non-flammable, i. e. it will not sustain a flame. Just why the particular organic bromides of the invention are exceptionally effective in flame-proofing the alkenyl aromatic resins is not fully known. It is assumed that they undergo little, if any, decomposition in the resin composition until the latter is heated to about, or somewhat below, the combustion point of the resin; that they then undergo a strongly endothermic decomposition, thereby consuming the heat energy that would otherwise cause combustion and at the same time releasing hydrogen bromide which aids in reducing the flammability of the gases given off; and that the endothermic decomposition of the organic bromide continues for a short time after removal of the composition from an outside flame, thereby serving to quench burning of the composition itself. The fact that the alkenyl aromatic resins are poor conductors of heat probably prevents overheating and decomposition of the organic bromide except at the point of external heating of the resin composition so that there remains a reservoir of undecomposed organic bromide inside the composition and this gradually becomes available to prevent advancement of combustion throughout the body of the resin composition. Also, the fact that the organic bromides of the invention are fairly compatible with the alkenyl aromatic resins permits ready distribution of the bromides throughout the body of the resins. The thoroughness of distribution of the organic bromides throughout the resin body undoubtedly contributes to the effectiveness of the flame-retarding action.

The non-flammable alkenyl aromatic resin compositions which are required for production of the non-flammable cellular bodies are prepared by incorporating from 2 to 10, usually from 3 to 5, per cent by weight of one or more of the aforementioned organic bromides throughout a body of the resin, e. g. polystyrene. A small amount, e. g. from 0.5 to 1 per cent by weight, of an agent to stabilize the organic bromide against the action of moisture, light, or moderately elevated temperatures, may also be incorporated in the resin to avoid or reduce the extent of, discoloration which otherwise frequently occurs during production of the cellular bodies, but a stabilizer is not required. For heat-insulating purposes the cellular bodies are usually employed in walls or other concealed places; hence, a development of color during production of the same does not impair their utility. A variety of suitable stabilizing agents are known in the art. Among the various agents which may, if desired, be added to stabilize the organic bromides are benzoic acid, tetra-lead pyrophosphate, sodium tripolyphosphate (i. e. $Na_5P_2O_{10}$), tetraphenyl tin, 2,6-di-(tert.-butyl)-4-methyl-phenol, methyl para-hydroxy-benzoate, the disodium salt of the calcium chelate of versene acid, and the dilithium salt of versene acid, etc.

Other addition agents such as pigments, finely divided fillers, or lubricants, etc., may also be incorporated in the resin compositions, but are not required.

The organic bromide, and other of the above-mentioned agents if desired, may be incorporated together with the alkenyl aromatic resin prior to or during employment of the resin to form a cellular body. Incorporation of the addition agents in the resin may be accomplished in any of a number of ways. For instance, a non-uniform mixture of polystyrene and the organic bromide may be heated to render the polystyrene plastic and be milled or kneaded, e. g. on compounding rolls or by passage through a worm-feed extrusion device, to cause thorough and substantially uniform mixing of the organic bromide throughout the body of polystyrene. Other of the aforementioned agents may be admixed with the resin in this same step. Again, the organic bromide and the resin may be dissolved in a mutual solvent such as benzene, toluene, or carbon tetrachloride, etc., and the solvent thereafter be distilled or vaporized from the mixture. The resin composition obtained in either of these ways is a non-flammable, thermoplastic solid which may be used for production of the non-flammable cellular bodies.

A method for producing cellular bodies from granules of polystyrene or other thermoplastic resins is fully described in U. S. Patent No. 2,450,436 and need not be repeated in detail. In brief, it comprises dissolving a normally gaseous agent, such as methyl chloride or methyl ether, etc., in the resin under pressure to form a mobile, or flowable, gel and thereafter releasing the pressure, e. g. by extrusion of the gel from the vessel in which it was formed. Thereupon, the dissolved normally gaseous agent vaporizes and simultaneously swells and cools the body of resin and forms a non-flammable cellular body composed of a large number of individually closed cells having thin walls of the resin.

The procedure set forth in the above-mentioned U. S. Patent No. 2,450,436 is directly applicable in making the non-flammable cellular bodies of this invention. In instances in which an organic bromide has been pre-incorporated in an alkenyl aromatic resin to render the latter non-flammable, the resin composition may be employed directly in the method of said patent to obtain a non-flammable, cellular, resinous product. Alternatively, the organic bromide may be admixed with, and, dissolved in, the resin during the step of dissolving the normally gaseous agent in the resin under pressure. Thereafter, the pressure may be released to cause swelling and cooling of the resinous body with formation of a non-flammable cellular mass which may be cut into heat-insulating panels or other desired shapes or forms. Articles cut from such mass have the cells ruptured at the outer surface, i. e. at the surface formed by the cutting operation, but are otherwise composed of individually closed cells.

The following examples describe a number of ways in which the invention has been practiced, but are not to be construed as limiting its scope.

*Example 1*

A mixture of 97.5 parts by weight of granular polystyrene and 2.5 parts of powdered alpha,beta-dibromoethylbenzene was heated in a chamber to temperatures of from 140° to 170° C. and methyl chloride was charged into the chamber at a pressure of from 250 to 300 pounds per square inch while stirring the mixture. The temperature of the mixture was lowered to about 100° C. while stirring the same and maintaining it under a methyl chloride pressure within the range just stated. Methyl chloride and the alpha,beta-dibromoethylbenzene were thereby dissolved in the polystyrene with formation of a mobile, i. e. flowable, gel which was extruded through an orifice from the pressurized chamber. Upon extrusion of the gel from the chamber into the atmosphere, the methyl chloride vaporized causing simultaneous swelling and cooling of the polystyrene with resultant formation of a solid cellular body composed of a large number of very small individually closed cells having thin walls of a solid solution of polystyrene and the alpha,beta-dibromoethylbenzene. The cells of the product were of a substantially uniform size, slightly larger than microscopic, i. e. of a size barely visible to the eye. The product was strong, rigid and remained stable on standing. It was white, i. e. uncolored, and could be sawed, or otherwise cut into panels suitable for use as a heat insulating material. Upon being held in an open flame, it sintered and charred somewhat giving off a gas, part of which burned in the flame, but upon removal from the flame it ceased to burn and there was no after-glow. Test pieces cut from the cellular product were tested by standard test procedures and found to have a compression strength of from 24 to 31 pounds per square inch, a compression modulus of from 1100 to 1330 pounds per square inch and a bending modulus of from 1300 to 1800 pounds per square inch.

*Example 2*

This example shows the preparation of non-flammable cellular bodies from polystyrene and from 2 to 10 per cent of other of the organic bromides which are required by the invention. For comparative purposes, it also includes experiments in which various organic bromides outside the scope of the invention are employed together with polystyrene in attempt to make non-flammable cellular bodies and shows that the cellular products obtained in these instances are flammable, i. e. they burn and sustain a flame. Except for the kind of organic bromide employed, the procedure in making the cellular products of this example is similar to that described in Example 1. The following table names the organic bromide for each experiment and gives its proportion as per cent of the combined weight of the same and the polystyrene. The table indicates whether the cellular products are non-flammable or whether they burn and sustain a flame. It also indicates which of the experiments are in accordance with the invention and which are outside the invention.

TABLE

| Expt. No. | In accord with Invention | Organic Bromide Kind | Per cent | Flammability of Cellular Product |
|---|---|---|---|---|
| 1 | Yes | 2,3-dibromopropanol | 3 | non-flammable. |
| 2 | Yes | ___do___ | 5 | Do. |
| 3 | Yes | ___do___ | 10 | Do. |
| 4 | Yes | 1,2,3-tribromopropane | 2 | Do. |
| 5 | Yes | ___do___ | 3 | Do. |
| 6 | Yes | ___do___ | 5 | Do. |
| 7 | Yes | ___do___ | 10 | Do. |
| 8 | Yes | 1,2,4-tribromobutane | 2 | Do. |
| 9 | Yes | ___do___ | 5 | Do. |
| 10 | Yes | ___do___ | 10 | Do. |
| 11 | Yes | tetrabromopentane | 2 | Do. |
| 12 | Yes | ___do___ | 3 | Do. |
| 13 | Yes | ___do___ | 5 | Do. |
| 14 | Yes | ___do___ | 10 | Do. |
| 15 | Yes | beta,beta'-dibromodiethyl ether. | 3 | Do. |
| 16 | Yes | 1,2-di-(dibromomethyl-)benzene. | 2 | Do. |
| 17 | Yes | alpha,beta-dibromoethylbenzene. | 1 | Do. |
| 18 | Yes | ___do___ | 3 | Do. |
| 19 | Yes | ___do___ | 5 | Do. |
| 20 | Yes | ___do___ | 10 | Do. |
| 21 | No | pentachloroethane | 10 | burns. |
| 22 | No | ethylene bromohydrin | 10 | Do. |
| 23 | No | dibromoethane | 10 | Do. |
| 24 | No | ethylene chloro-bromide | 10 | Do. |
| 25 | No | 1,3-dibromopropane | 10 | Do. |
| 26 | No | propylene chloro-bromide. | 10 | Do. |
| 27 | No | 1,2-dibromobutane | 10 | Do. |
| 28 | No | dibromobutyric acid | 10 | Do. |
| 29 | No | beta-bromobutyric acid | 10 | Do. |
| 30 | No | ethyl dibromoacetate | 10 | Do. |
| 31 | No | hexachlorocyclo-pentadiene. | 10 | Do. |
| 32 | No | ethyl alpha,beta-dibromopropionate. | 10 | Do. |
| 33 | No | monobromobenzene | 10 | Do. |
| 34 | No | monobromodichlorobenzene. | 10 | Do. |
| 35 | No | dibromodichlorobenzene. | 10 | Do. |
| 36 | No | para-bromochlorobenzene. | 10 | Do. |
| 37 | No | hexabromobenzene | 10 | Do. |
| 38 | No | tribromophenol | 10 | Do. |
| 39 | No | octabromo-diphenyl ether. | 10 | Do. |
| 40 | No | alpha-bromo-naphthalene. | 10 | Do. |

By procedure similar to that described in the foregoing examples, non-flammable cellular bodies of other thermoplastic alkenyl aromatic resins may be prepared by incorporating together with any such resin from 2 to 10 per cent by weight of any of the aforementioned organic bromides which are required by the invention and employing the resultant composition to form the cellular body. Illustrative compositions which are suitable for the purpose are intimate mixtures of a solid polymer of alpha-methylstyrene and from 2 to 10 per cent by weight of alpha, beta-dibromoethylbenzene, a solid copolymer of 80 per cent by weight of styrene and 20 per cent of alpha-methylstyrene having 5 per cent of 1,2-di-(dibromomethyl) benzene incorporated therewith, and a polymer of ar-vinylxylene having 5 per cent of 1,2,3-tribromopropane incorporated therewith.

Other modes of applying the principle of the invention may be employed instead of those explained, change being made as regards the method or cellular products herein disclosed, provided the steps or compounds stated by any of the following claims or the equivalent of such stated steps or compounds be employed.

We therefore particularly point out and distinctly claim as our invention:

1. A solid, non-flammable, cellular, resinous body, composed for the most part of a multiplicity of individually closed cells having thin walls of a solid solution of a thermoplastic polymer comprising in chemically combined form at least 50 per cent by weight of at least one alkenyl aromatic compound having the general formula:

$$Ar-\underset{|}{\overset{R}{C}}=CH_2$$

wherein Ar represents an aromatic radical of the group consisting of hydrocarbon and halohydrocarbon radicals of the benzene series and R represents a member of the group consisting of hydrogen and the methyl radical together with from 1 to 10 per cent by weight of alpha, beta-dibromoethylbenzene.

2. A solid, non-flammable, cellular, resinous body, composed for the most part of a multiplicity of individually closed cells having thin walls of a solid solution of polystyrene and from 3 to 10 per cent by weight of alpha, beta-dibromoethylbenzene.

3. A solid, non-flammable, cellular, resinous body, composed for the most part of a multiplicity of individually closed cells having thin walls of a solid solution of an alkenyl aromatic resin and from 1 to 10 per cent by weight of 1,2-di-(dibromomethyl) benzene.

4. A solid, non-flammable, cellular, resinous body, composed for the most part of a multiplicity of individually closed cells having thin walls of a solid solution of polystyrene and from 3 to 10 per cent by weight of 1,2-di-(dibromomethyl) benzene.

5. A solid, non-flammable, cellular, resinous body composed for the most part of a multiplicity of individually closed cells having thin walls of a solid solution of a thermoplastic polymer comprising, in chemically combined form, at least 50 per cent by weight of at least one alkenyl aromatic compound having the general formula:

$$Ar-\underset{|}{\overset{R}{C}}=CH_2$$

wherein Ar represents an aromatic radical of the group consisting of hydrocarbon and halohydrocarbon radicals of the benzene series and R represents a member of the group consisting of hydrogen and the methyl radical, together with from 1 to 10 per cent by weight of at least one polyhalogenated alkyl aromatic hydrocarbon of the benzene series containing from 8 to 10 carbon atoms in the molecule and having at least two, but not all, of the hydrogen atoms of each alkyl radical replaced by bromine and containing at least one such brominated alkyl radical in the molecule.

References Cited in the file of this patent

UNITED STATES PATENTS

| Number | Name | Date |
|---|---|---|
| 1,985,771 | Eichengrun | Dec. 25, 1934 |
| 2,450,436 | McIntire | Oct. 5, 1948 |

FOREIGN PATENTS

| Number | Country | Date |
|---|---|---|
| 554,602 | Great Britain | July 12, 1943 |